United States Patent
Aoki et al.

(10) Patent No.: US 10,006,488 B2
(45) Date of Patent: Jun. 26, 2018

(54) MOTION GUIDE DEVICE AND ACTUATOR (71) Applicant: THK CO., LTD., Tokyo (JP)

(72) Inventors: Shinji Aoki, Tokyo (JP); Hiroki Irikawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days. days.

(21) Appl. No.: 15/511,830

(22) PCT Filed: Aug. 17, 2015

(86) PCT No.: PCT/JP2015/004077
§ 371 (c)(1),
(2) Date: Mar. 16, 2017

(87) PCT Pub. No.: WO2016/042702
PCT Pub. Date: Mar. 24, 2016

(65) Prior Publication Data
US 2017/0307011 A1    Oct. 26, 2017

(30) Foreign Application Priority Data
Sep. 19, 2014 (JP) ................. 2014-190685

(51) Int. Cl.
*F16C 29/06* (2006.01)
(52) U.S. Cl.
CPC ........ *F16C 29/0609* (2013.01); *F16C 29/063* (2013.01)
(58) Field of Classification Search
CPC .... F16C 29/005; F16C 29/06; F16C 29/0602; F16C 29/0609; F16C 29/063
See application file for complete search history.

(56) References Cited

U.S. PATENT DOCUMENTS 5,145,261 A    9/1992 Narumiya
5,951,168 A *  9/1999 Teramachi .......... F16C 29/0602
                                                    384/45
(Continued)

FOREIGN PATENT DOCUMENTS

JP    4-366017 A    12/1992
JP    2001-173718 A    6/2001
(Continued)

OTHER PUBLICATIONS

Translation of JP 2001-173718, obtained Feb. 8, 2018.*
(Continued)

*Primary Examiner* — James Pilkington
(74) *Attorney, Agent, or Firm* — Westerman, Hattori, Daniels & Adrian, LLP (57) ABSTRACT

Provided is a motion guide device including a track rail in which a rolling body rolling groove is formed and a movable block which is mounted on the track rail via a plurality of rolling bodies. The movable block includes a movable block body which has a loaded rolling body rolling groove forming a loaded rolling body rolling passage in cooperation with the rolling body rolling groove and has a non-loaded rolling body rolling passage, return members in which inner peripheral-side direction change grooves connecting the loaded rolling body rolling passage and the non-loaded rolling body rolling passage are formed, and end plates. The end plate has a rolling body scooping arm protruding in a direction of a connection surface with the movable block body and a rolling body scooping groove continuous with the outer peripheral-side direction change groove is formed in the rolling body scooping arm.

3 Claims, 11 Drawing Sheets

(56) References Cited

U.S. PATENT DOCUMENTS

| | | | | |
|---|---|---|---|---|
| 6,685,354 B2* | 2/2004 | Michioka | ............ | F16C 29/0609 |
| | | | | 384/45 |
| 6,874,939 B2* | 4/2005 | Michioka | ............ | F16C 29/0609 |
| | | | | 384/45 |
| 7,980,763 B2* | 7/2011 | Michioka | ............ | F16C 29/0609 |
| | | | | 384/43 |
| 2005/0213856 A1 | 9/2005 | Geka et al. | | |

FOREIGN PATENT DOCUMENTS

| | | |
|---|---|---|
| JP | 2004-19728 A | 1/2004 |
| JP | 2004-68880 A | 3/2004 |
| JP | 2005-273765 A | 10/2005 |

OTHER PUBLICATIONS

International Search Report dated Nov. 17, 2015, issued in counterpart application No. PCT/JP2015/004077. (2 pages).
Notice of Allowance dated Apr. 19, 2016, issued in counterpart Japanese Patent Application No. 2014-190685, w/ English translation (7 pages).

* cited by examiner

Fig. 6(a) CONVENTIONAL ART    Fig. 6(b) PRESENT EMBODIMENT    Fig. 6(c)

Fig. 7 (a) CONVENTIONAL ART   Fig. 7 (b) PRESENT EMBODIMENT

MOTION GUIDE DEVICE AND ACTUATOR

TECHNICAL FIELD

The present invention relates to a motion guide device and, particularly, relates to a motion guide device capable of performing stable guiding motion. Furthermore, the present invention relates to an actuator constituted using the motion guide device.

BACKGROUND ART

A linear guide as an example of a motion guide device includes a track rail in which a plurality of ball rolling grooves are formed extending parallel to one another along a longitudinal direction and a movable block which is relatively movably mounted on the track rail via a plurality of balls. The movable block is constituted of a movable block body which has a loaded ball rolling groove forming a loaded ball rolling passage in cooperation with the ball rolling groove and has a non-loaded ball rolling passage arranged parallel to the loaded ball rolling groove, return members which are attached to both end surfaces of the movable block body in a relative movement direction and in which inner peripheral-side direction change grooves connecting a part of the loaded ball rolling passage and a part of the non-loaded ball rolling passage are formed, and a pair of end plates which is mounted on both end surfaces of the movable block body in the relative movement direction so as to cover the return members and in which outer peripheral-side direction change grooves are formed in surface sides where the end plates are mounted on the movable block body.

The balls rolling in the plurality of ball rolling grooves formed in the track rail are scooped up from the ball rolling groove by scooping portions in the lower edges of the end plate and enter a direction change passage formed by the inner peripheral-side direction change groove and the outer peripheral-side direction change groove. The ball passing through one direction change passage and circulating the non-loaded ball rolling passage is pushed by the following ball and enters the other direction change passage, and then enters the loaded ball rolling passage (between the ball rolling groove of the track rail and the loaded ball rolling groove of the movable block) again.

In the case of such a linear guide, there is a possibility that the scooping portion in the lower edge of the end plate is broken when the movable block is moved at high speed (equal to or faster than 2.5 m/s, for example). The motion guide device disclosed in Patent Literature 1 has been known as a motion guide device in which such a possibility is reduced and it is difficult for the scooping portion to be broken even when the movable block is moved at high speed.

CITATION LIST

Patent Literature

Patent Literature 1: JP 2004-68880 A

DISCLOSURE OF THE INVENTION

Problems to be Solved by the Invention

However, in recent industrial society, there are a demand for expansion of the application range of the motion guide device described above and a demand for further high-speed (equal to or faster than 5 m/s, for example) operation of the movable block. However, it is extremely difficult for the related art to realize a motion guide device capable of stably performing the high-speed movement while the shape of the device of the related art is maintained or the size of the device is reduced.

The present invention is made in view of the possibility described above. An object of the present invention is to provide a new motion guide device achieving reduction in the size of the device and realizing high-speed and highly accurate guide motion which cannot be realized in the related art by providing new improved technology where high-speed guiding of the motion guide device can be achieved.

Means for Solving the Problems

A motion guide device according to the present invention includes a track rail in which a rolling body rolling groove is formed along a longitudinal direction and a movable block which is relatively movably mounted on the track rail via a plurality of rolling bodies, in which the movable block includes a movable block body which has a loaded rolling body rolling groove forming a loaded rolling body rolling passage in cooperation with the rolling body rolling groove and has a non-loaded rolling body rolling passage arranged parallel to the loaded rolling body rolling groove, return members which are attached to both end surfaces of the movable block body in a relative movement direction and in which inner peripheral-side direction change grooves connecting a part of the loaded rolling body rolling passage and a part of the non-loaded rolling body rolling passage are formed, and a pair of end plates which is mounted on both end surfaces of the movable block body in the relative movement direction to cover the return members and in which outer peripheral-side direction change grooves are formed in surface sides where the end plates are mounted on the movable block body, wherein the end plate has a rolling body scooping arm protruding in a direction of a connection surface with the movable block body and a rolling body scooping groove continuous with the outer peripheral-side direction change groove is formed in the rolling body scooping arm.

Effects of the Invention

According to the present invention, it is possible to provide a new motion guide device achieving reduction in the size of the device and realizing high-speed and highly accurate guide motion. In addition, according to the present invention, it is possible to provide an actuator constituted using the motion guide device.

BRIEF DESCRIPTION OF THE DRAWINGS

FIGS. 6(a) to 6(c) are views for illustrating the operation effects which can be exhibited by the rolling body scooping arm in accordance with the present embodiment in which FIG. 6(a) illustrates the related art, FIG. 6(b) illustrates the present embodiment, and FIG. 6(c) illustrates a supplementary view for describing the operation effects.

FIGS. 7(a) and 7(b) are views for illustrating the operation effects which can be further exhibited by the rolling body scooping arm in accordance with the present embodiment in which FIG. 7(a) illustrates the related art and FIG. 7(b) illustrates the present embodiment.

BEST MODE FOR CARRYING OUT THE INVENTION

Hereinafter, embodiments suitable for carrying out the present invention will be described with reference to accompanying drawings. The embodiments described below do not intended to limit the invention according to each claim and all the combinations of features described in the embodiments are not necessarily required for the solution means of the invention.

Figure 1:
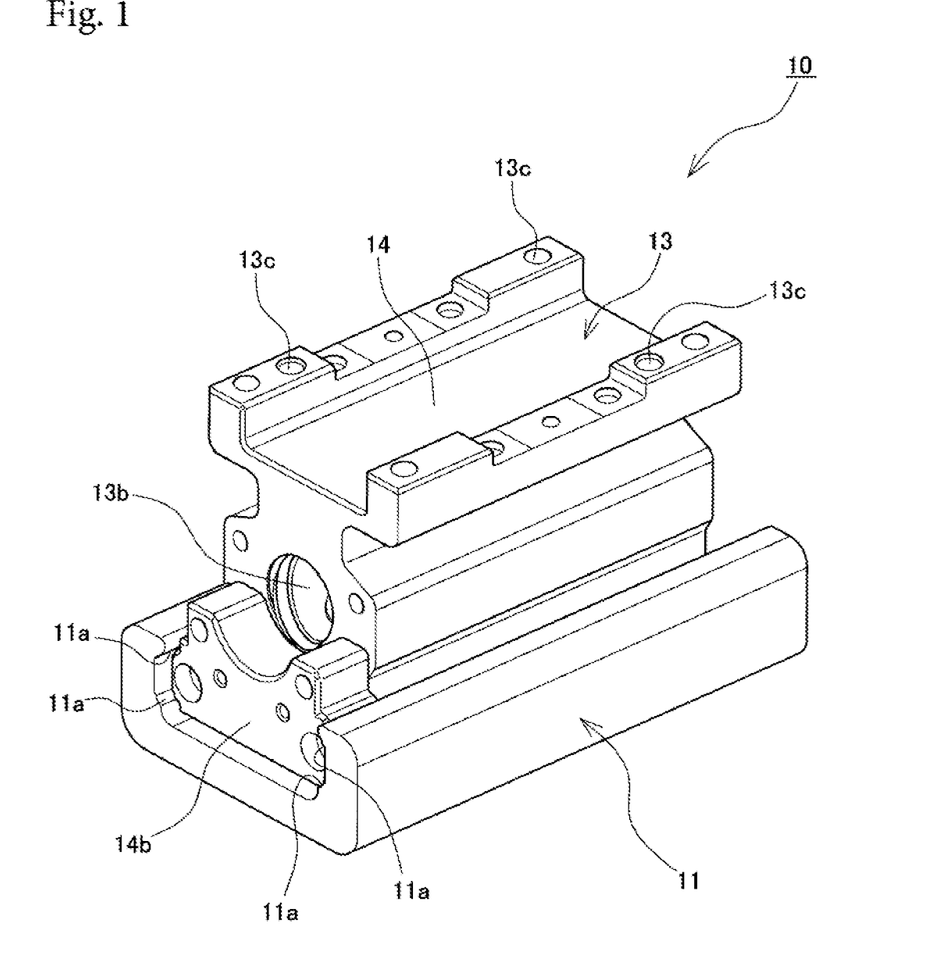
FIG. 1 is a view illustrating an example of a motion guide device in accordance with the present embodiment and, particularly, is a perspective view for illustrating the schematic configuration of the motion guide device in accordance with the present embodiment.
Figure 2:
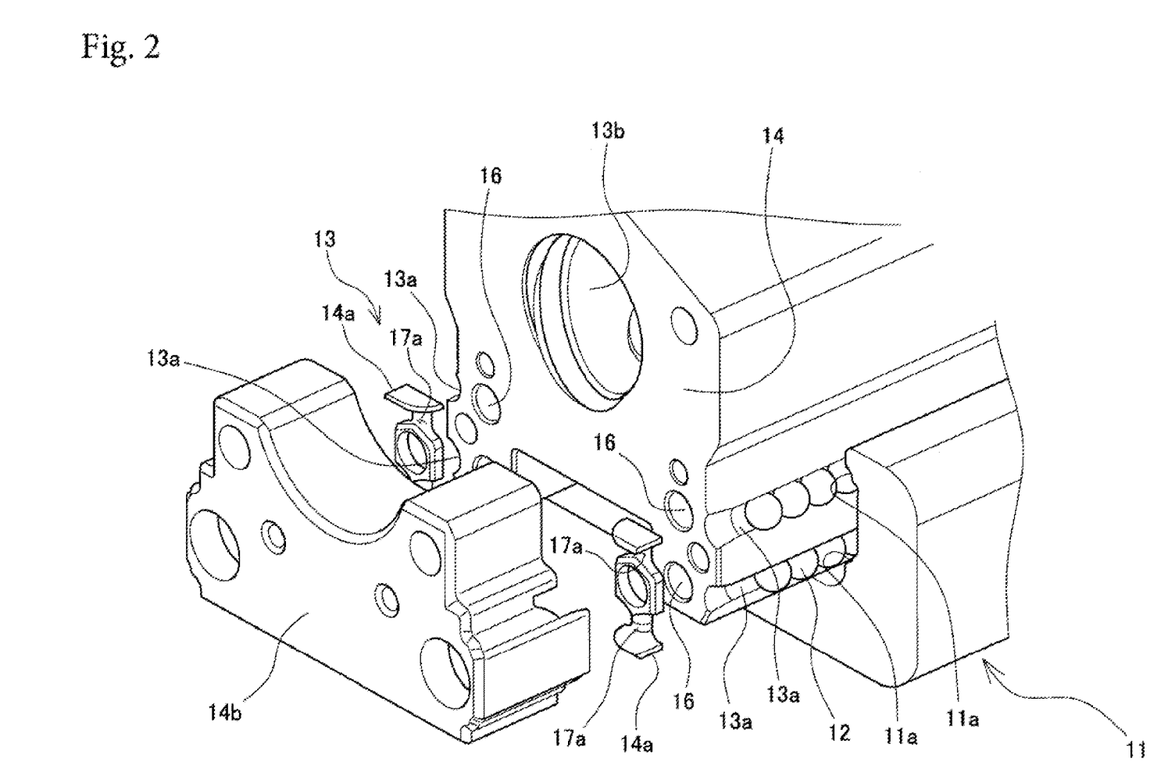
FIG. 2 is a view illustrating an example of the motion guide device in accordance with the present embodiment and, particularly, is an enlarged exploded view of principal parts of the motion guide device in accordance with the present embodiment.
Figure 3:
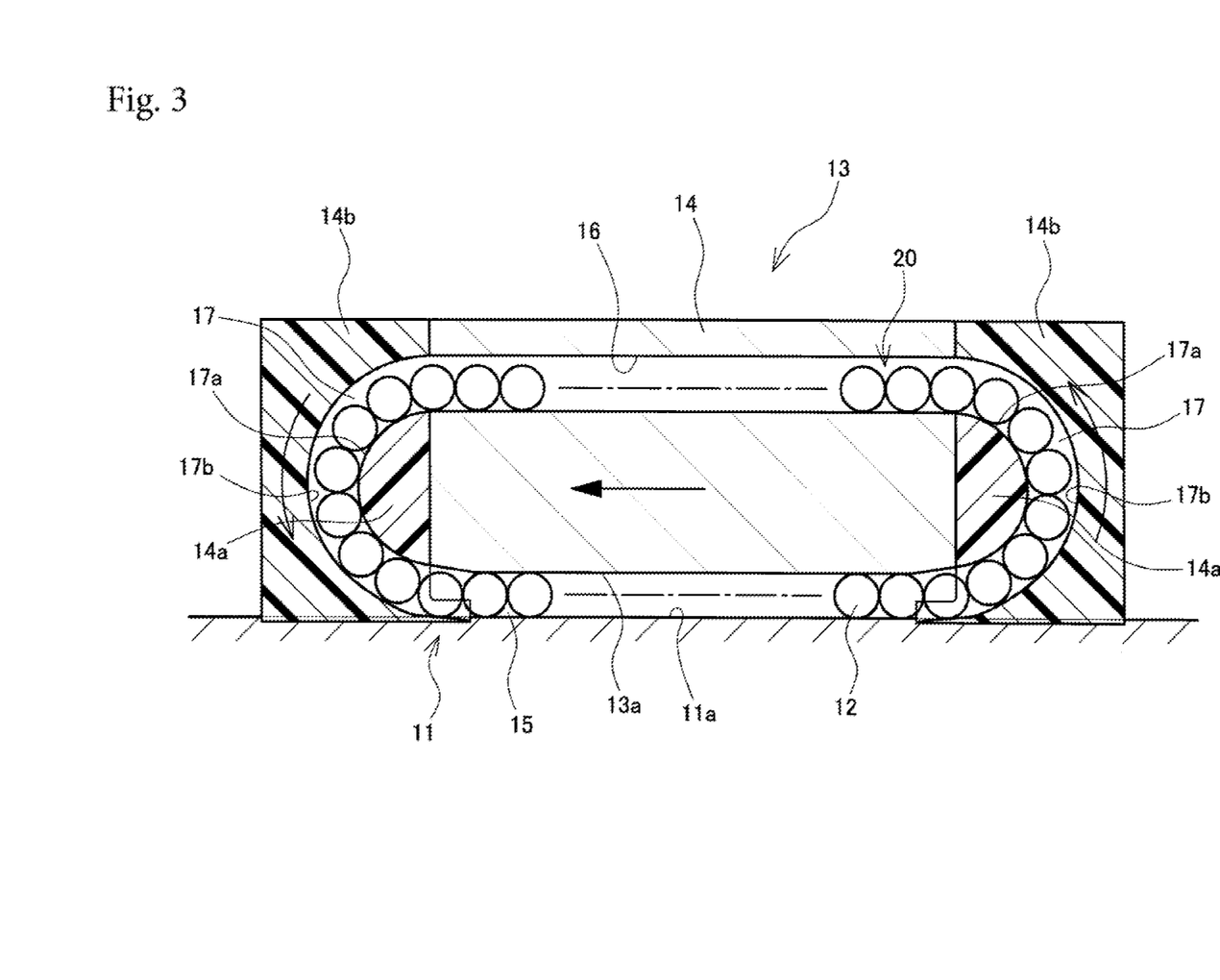
FIG. 3 is a schematic view for illustrating an infinite circulation passage of the motion guide device in accordance with the present embodiment.

FIGS. 1 and 2 are views illustrating an example of a motion guide device in accordance with a present embodiment. Particularly, FIG. 1 is a perspective view for illustrating the schematic configuration of the motion guide device in accordance with the present embodiment and FIG. 2 is an enlarged exploded view of principal parts of the motion guide device in accordance with the present embodiment. In addition, FIG. 3 is a schematic view for illustrating an infinite circulation passage of the motion guide device in accordance with the present embodiment.

A motion guide device 10 in accordance with the present embodiment indicates the motion guide device 10 of a type in which a linear motion guide and a ball screw are combined into an integrated structure. As a main structure, the motion guide device 10 includes a track rail 11 as a rail member and a movable block 13 which is movably mounted on the track rail 11 via balls 12 as a rolling body. In addition, an opening portion 13b in which a thread groove of a spiral shape is formed is provided in the center portion of the movable block 13. A screw shaft (not illustrated) which passes through the opening portion 13b and is rotationally movably mounted via balls (not illustrated) is provided in the opening portion 13b.

The track rail 11 is a lengthy member having a substantially U-shaped cross-sectional surface. In both inner-side side surfaces of the track rail 11, two ball rolling grooves 11a as a rolling body rolling groove capable of accommodating the balls 12 are formed in the right side and the left side so as to extend over the entire length of the track rail 11. In other words, the track rail 11 in accordance with the present embodiment is a member constituted as an outer rail which is provided so as to cover the lower side of the movable block 13 described below. A plurality of bolt mounting holes (not illustrated) is formed in the track rail 11 at appropriate intervals in the longitudinal direction thereof. The track rail 11 is fixed to a predetermined mounting surface, for example, an upper surface of the bed of a machine tool, by bolts (not illustrated) screwed into the bolt mounting holes (not illustrated). Although the track rail 11 illustrated in the drawing has a linear shape, a curved shaped rail may also be used.

The movable block 13 is constituted so as to have a movable block body 14 having a configuration in which holes are drilled in a high-strength metal material such as steel (see FIG. 2). Four loaded ball rolling grooves 13a as a loaded rolling body rolling groove which respectively face four ball rolling grooves 11a of the track rail 11 are provided in the movable block body 14. Four loaded ball rolling passages 15 as a loaded rolling body rolling passage are formed between the track rail 11 and the movable block 13 by combining the ball rolling groove 11a and the loaded ball rolling groove 13a.

Four non-loaded ball rolling passages 16 as a non-loaded rolling body rolling passage are formed in the movable block body 14 so as to be arranged parallel to the four loaded ball rolling grooves 13a. In the movable block body 14, return pieces 14a as a return member in each of which an inner peripheral-side direction change groove 17a is formed to connect a part of the loaded ball rolling passage 15 and a part of the non-loaded ball rolling passage 16 are attached to both end surfaces of the movable block body 14. Furthermore, a pair of end plates 14b is attached to both end surfaces of the movable block body 14 so as to cover the pair of return pieces 14a. In the end plate 14b, an outer peripheral-side direction change groove 17b recessed in an arch shape is formed in a surface side where the end plate 14b is attached to the movable block body 14. The inner peripheral-side direction change groove 17a and the outer peripheral-side direction change groove 17b cooperate with each other and form a direction change passage 17. As schematically illustrated in FIG. 3, the direction change passage 17 is a rolling passage which is formed to protrude in an arch shape between the loaded ball rolling passage 15 and the non-loaded ball rolling passage 16. The direction change passage 17 scoops up the plurality of balls 12 which receive load and linearly move in the loaded ball rolling passage 15, changes the direction of the balls 12 in a non-loaded state, and sends the balls 12 to the non-loaded ball rolling passage 16. In addition, the direction change passage 17 changes the direction of the plurality of balls 12 in the non-loaded state which linearly move in the non-loaded state in the non-loaded ball rolling passage 16 and sends the balls 12 to the loaded ball rolling passage 15 as a loading area.

As described above, the movable block 13 is constituted by combining the movable block body 14, the pair of return pieces 14a, and the pair of end plates 14b and, further, is mounted on the track rail 11. Therefore, the loaded ball rolling passage 15 as the loaded rolling body rolling passage, the non-loaded ball rolling passage 16 as the non-loaded rolling body rolling passage, and the direction change passage 17 are formed and the infinite circulation passage 20 in accordance with the present embodiment is constituted by combining the loaded ball rolling passage 15, the non-loaded ball rolling passage 16, and the pair of direction change passages 17.

A plurality of female threads 13c is formed on the upper surface of the movable block 13. The movable block 13 is fixed to a predetermined mounting surface, for example, a saddle of a machine tool or a lower surface of a table, using the female threads 13c. The movable block 13 not only is constituted only of metal material but also can adopt a configuration including a molded product made of a synthetic resin injection molded integrally with metal material having high strength such as steel.

Hereinbefore, the basic configuration of the motion guide device 10 in accordance with the present embodiment is described. Next, the characteristics of the motion guide device 10 in accordance with the present embodiment will be described with reference to FIGS. 4 to 8. Here, FIG. 4 is a view for illustrating the configuration of the end plate 14b in accordance with the present embodiment and is a perspective view of a surface side where a movable block body 14 is connected to the end plate 14b when viewed obliquely from above.

Figure 4:
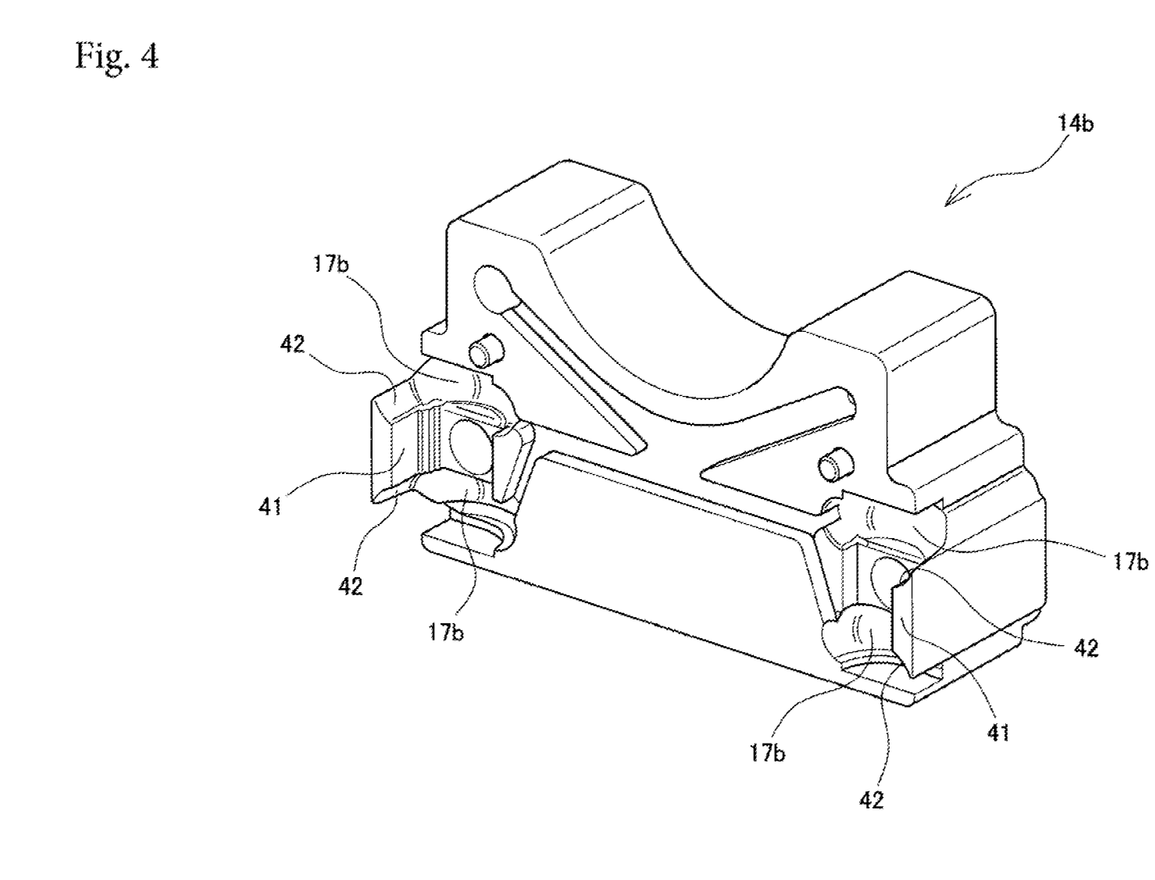
FIG. 4 is a view for illustrating the configuration of an end plate in accordance with the present embodiment and is a perspective view of a surface side where a movable block body is connected to the endplate when viewed obliquely from above.

As illustrated in FIG. 4, the endplate 14b in accordance with the present embodiment has a rolling body scooping arm 41 protruding in a direction of a connection surface with the movable block body 14. A rolling body scooping groove 42 continuous with the outer peripheral-side direction change groove 17b is formed in the rolling body scooping arm 41. Therefore, the rolling body scooping arm 41 is installed to be inserted into the movable block body 14. Further, the rolling body scooping groove 42 formed in the rolling body scooping arm 41 performs a function of scooping up the plurality of balls 12 rolling in the loaded ball rolling passage 15 to the direction change passage 17.

Figure 5:
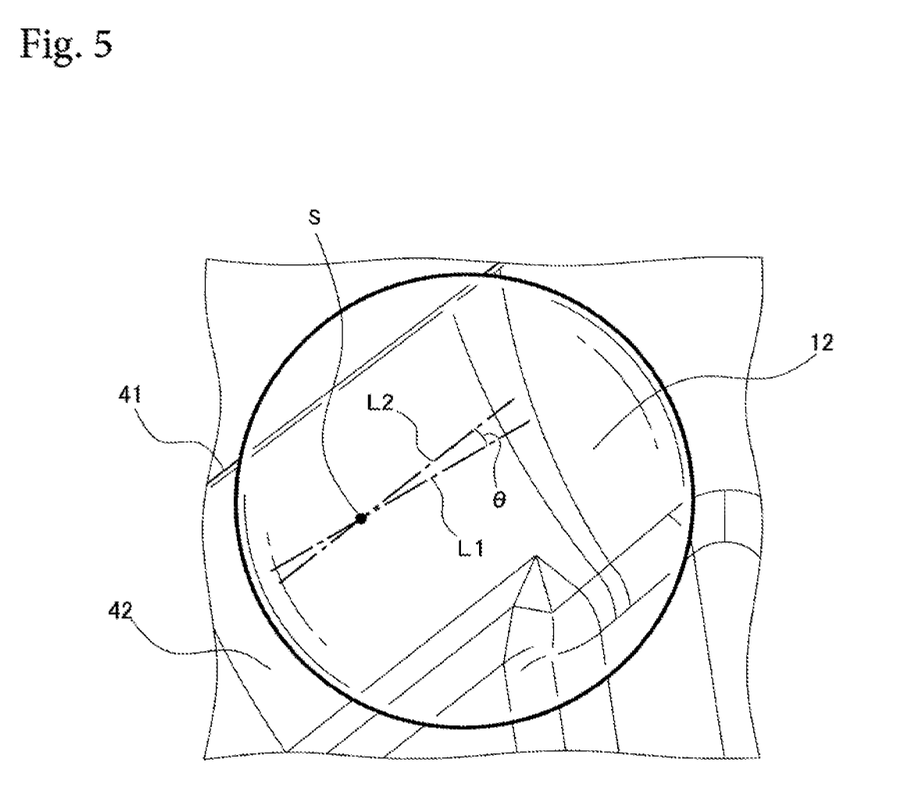
FIG. 5 is a view illustrating a state in which a rolling body scooping arm scoops a ball in accordance with the present embodiment.
Figure 6A:
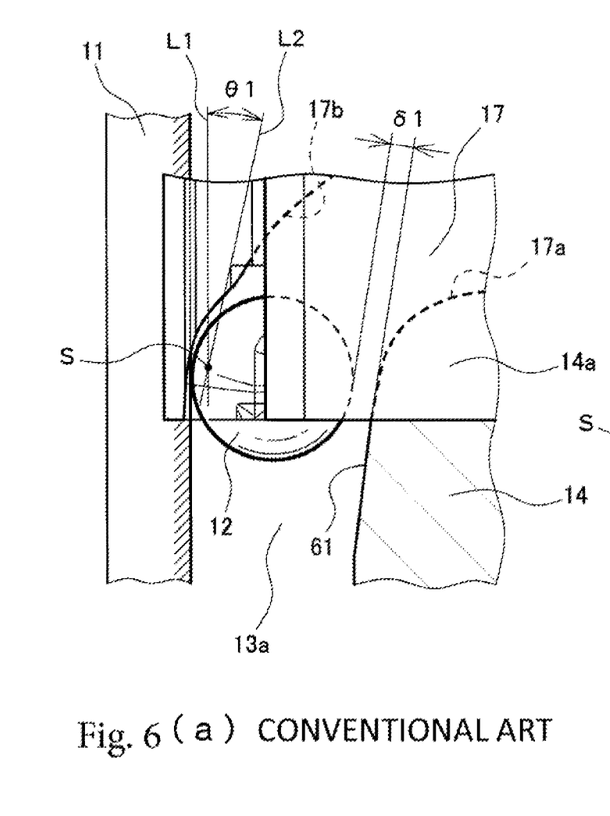
Figures 6B, 6C:
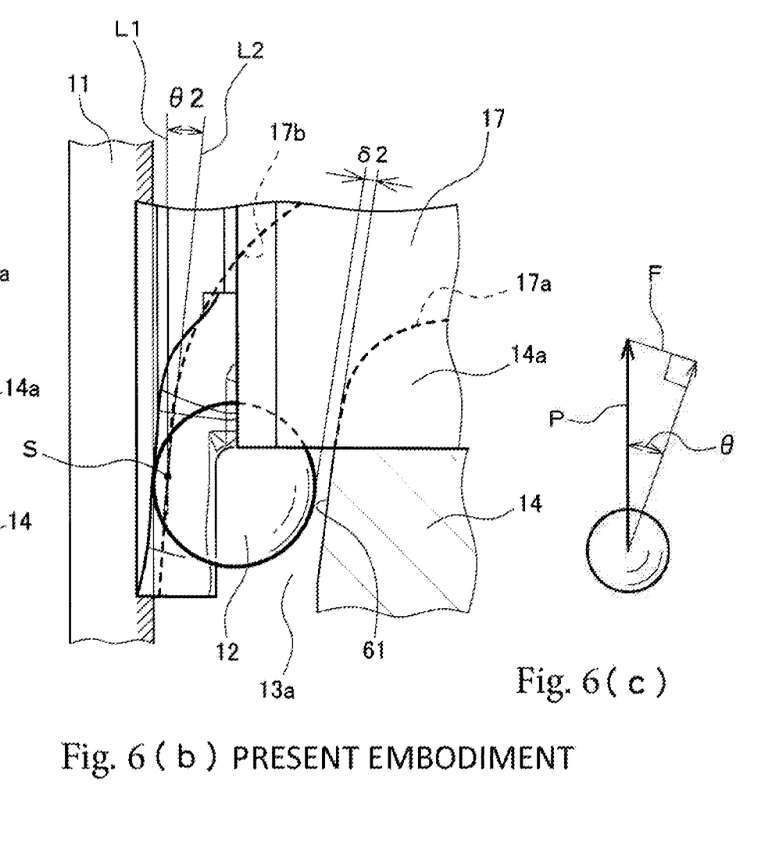
Figure 7A:
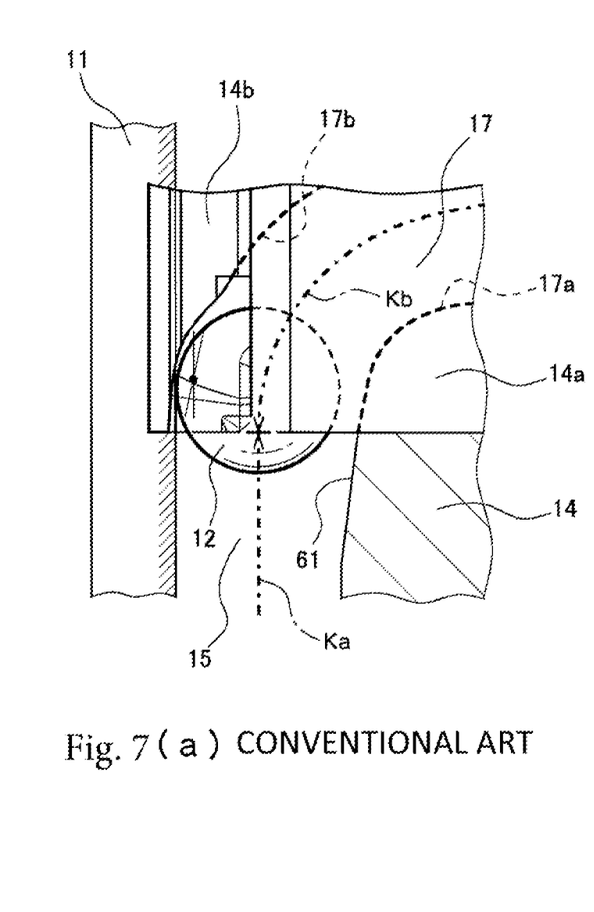
Figure 7B:
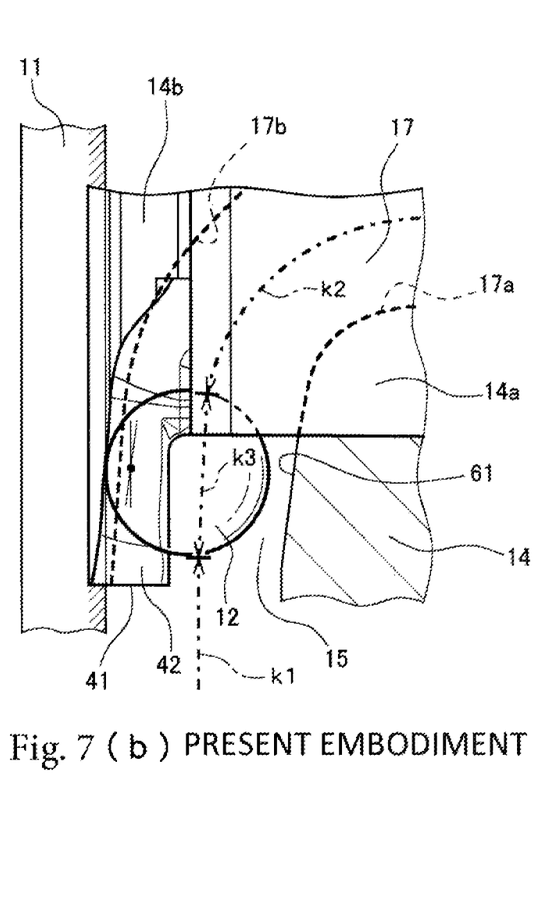
Figure 8:
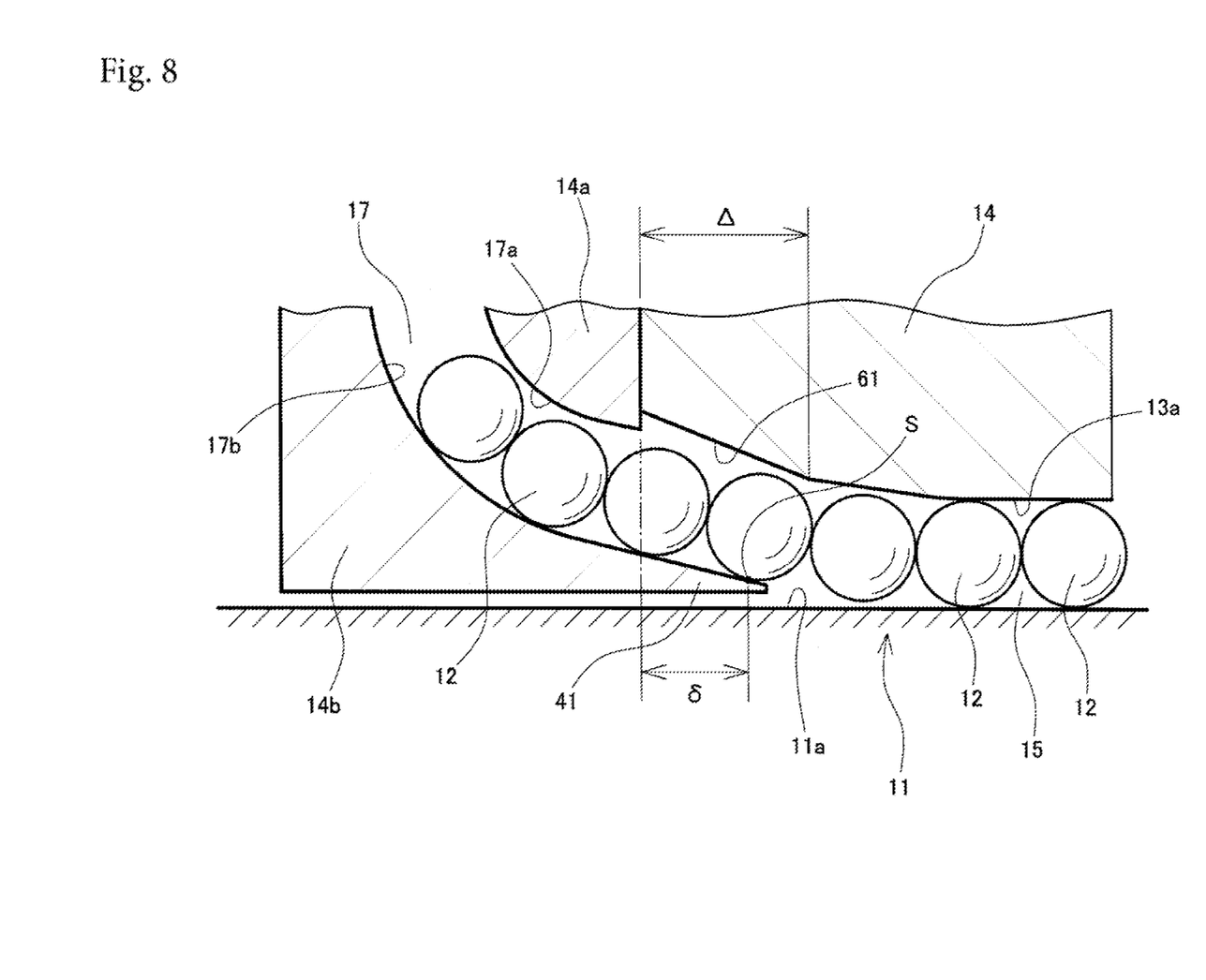
FIG. 8 is a schematic view for illustrating a forming condition of the rolling body scooping arm in accordance with the present embodiment.

The rolling body scooping arm 41 in accordance with the present embodiment illustrated in FIG. 4 exhibits various favorable operation effects. Here, FIGS. 5 to 8 are added to reference drawings to describe the operation effects. FIG. 5 is a view illustrating a state in which the rolling body scooping arm 41 scoops the ball 12 in accordance with the present embodiment. In addition, FIGS. 6(a) to 6(c) are views for illustrating the operation effects which can be exhibited by the rolling body scooping arm 41 in accordance with the present embodiment in which FIG. 6(a) illustrates the related art, FIG. 6(b) illustrates the present embodiment, and FIG. 6(c) illustrates a supplementary view for explaining the operation effects. Furthermore, FIGS. 7(a) and 7(b) are views for illustrating the operation effects which can be further exhibited by the rolling body scooping arm 41 in accordance with the present embodiment in which FIG. 7(a) illustrates the related art and FIG. 7(b) illustrates the present embodiment. Further, FIG. 8 is a schematic view for illustrating the forming condition of the rolling body scooping arm 41 in accordance with the present embodiment.

As illustrated in FIGS. 5 and 6(b), the end plate 14b in accordance with the present embodiment includes the rolling body scooping arm 41, and thus the rolling body scooping arm 41 is inserted into the movable block body 14 and located to protrude into the loaded ball rolling passage 15. Therefore, the plurality of balls 12 rolling in the loaded ball rolling passage 15 is scooped up by the rolling body scooping groove 42 formed in the rolling body scooping arm 41. However, compared to the case of the related art, a scooping starting point S at which the ball 12 is scooped up by the rolling body scooping arm 41 is located at a position close to the inner portion of the movable block body 14. In this case, when an angle, that is, a scooping angle θ of a ball, between a tangential direction L1 of the ball at the scooping starting point S and a ball travelling direction L2 relative to the tangential direction L1 of the ball at the scooping starting point S is considered, the scooping angle θ is reduced in the present embodiment where the scooping starting point S is located at a position close to the inner side of the movable block body 14, compared to the case of the related art where the scooping starting point S is located at the inner side of the end plate 14b. More specifically, when the scooping angle of the present embodiment is set to θ2 and the scooping angle of the related art is set to θ1, the relationship of θ2<θ1 is established.

How much the difference in the scooping angle θ affects the collision load on the end plate 14b is verified with reference to FIG. 6(c). A collision load F on the end plate 14b can be expressed by the following equation (1).

$$F = P \times \sin\theta \tag{1}$$

Here, the amount of P which is the load in the rolling direction of the ball 12 is constant in the motion guide devices of the same model number. Thus, the collision load on the end plate 14b is affected by the difference in the scooping angle θ.

When the case of the present embodiment is compared with the case of the related art, the relationship of $(\sin\theta2)/(\sin\theta1) < 1$ is established. Thus, in the case of the present embodiment of which the scooping angle θ is smaller than that of the related art, it is found that the collision load F on the end plate 14b is reduced. In other words, the motion guide device 10 in accordance with the present embodiment can reduce the scooping angle θ of the ball 12 by including the rolling body scooping arm 41, and thus the collision load applied to the end plate 14b can be extremely reduced by the configuration described above compared to the case of the related art. Therefore, it is possible to provide the motion guide device 10 satisfying, for example, the demand for high-speed (equal to or faster than 5 m/s, for example) operation of the movable block. As a result, according to the present embodiment, it is possible to provide a new motion guide device realizing high-speed and highly accurate guide motion which cannot be realized in the related art.

Furthermore, as illustrated in FIGS. 6(a) and 6(b), a gentle surface processing portion 61 subjected to gentle surface processing is formed in the end portion of the loaded ball rolling groove 13a formed in the movable block body 14 so as to prevent an undesirable level difference from occurring at the connection point between the loaded ball rolling groove 13a and the inner peripheral-side direction change groove 17a formed in the return piece 14a. Therefore, in the case of the related art, in the vicinity of the boundary between the loaded ball rolling groove 13a and the direction change passage 17, a relatively large gap 81 is generated between the ball 12 and the gentle surface processing portion 61 in the rolling passage by the presence of the gentle surface processing portion 61. As a result, there is a problem in that a play action of the ball 12 occurs in the vicinity of the gentle surface processing portion 61. However, in the present embodiment, the rolling body scooping groove 42 formed in the rolling body scooping arm 41 and the gentle surface processing portion 61 are arranged to face in the loaded ball rolling passage 15. In other words, a gap 82 between the ball 12 and the rolling passage can be reduced in the vicinity of the gentle surface processing portion 61 by the presence of the rolling body scooping arm 41 which is provided to protrude in the loaded ball rolling passage 15. That is, the present embodiment is configured to satisfy a condition of δ1>δ2, and thus the frequency of occurrence of the play action of the ball 12 in the vicinity of the gentle surface processing portion 61 is reduced compared to the case of the related art. Therefore, a stably aligned rolling motion of the plurality of balls 12 is realized.

Further, it is found that a favorable operation for a direction change operation of the ball 12 can be achieved by the presence of the rolling body scooping arm 41 in accordance with the present embodiment. In other word, as illustrated in FIGS. 7(a) and 7(b), when the rolling trajectory of the center point of the ball at which the ball 12 rolls from the loaded ball rolling passage 15 to the direction change passage 17 is grasped as an imaginary line K, it is possible to know that, in the case of the related art illustrated in FIG. 7(a), the imaginary line K illustrated by the one dot chain line in FIG. 7(a) is constituted of a first imaginary line Ka which can be grasped as a straight line in the loaded ball rolling passage 15 and a second imaginary line Kb which can be grasped as a curved line with constant curvature in the direction change passage 17. However, in the case of such a related art, the ball 12 performs a rolling operation such that the center point of the ball draws a rolling trajectory along the second imaginary line Kb which can be grasped as a curved line with constant curvature, the rolling trajectory being suddenly changed from the first imaginary line Ka which can be grasped as the straight line. Therefore, the plurality of balls 12 are forced to abruptly change the direction thereof. Particularly, the configuration of the related art becomes a factor that hinders the smooth and stable rolling operation at the high-speed movement. Therefore, in the case of the related art, it is difficult to provide a motion guide device 10 satisfying the demand for high-speed (equal to or faster than 5 m/s, for example) operation of the movable block.

However, in the case of the present embodiment illustrated in FIG. 7(b), it is possible to know that the imaginary line K illustrated by the one dot chain line in FIG. 7(b) is constituted of a first imaginary line K1 which can be grasped as a straight line in the loaded ball rolling passage 15, a second imaginary line K2 which can be grasped as a curved line with constant curvature in the direction change passage 17, and a third imaginary line K3 which passes through the contact surface between the movable block body 14 and the end plate 14b, is continuous as a line connecting the first imaginary line K1 and the second imaginary line K2, and is directed to a direction different from that of the first imaginary line K1. In addition, the third imaginary line K3 is configured to overlap the position at which the gentle surface processing portion 61 is formed. In other words, in the case of the present embodiment, the imaginary line K is not abruptly connected from the first imaginary line K1 which can be grasped as the straight line to the second imaginary line K2 which can be grasped as the curved line with constant curvature, and the third imaginary line K3 connecting the first imaginary line K1 and the second imaginary line K2 is provided by the presence of the rolling body scooping arm 41. In the present embodiment, the imaginary line K as a rolling trajectory drawn by the center point of the ball draws a smooth movement trajectory by such a configuration. Therefore, according to the present embodiment, the plurality of balls 12 subjected to direction change are prevented from being forced to abruptly change the direction thereof and performs a direction change operation in multiple stages along three line segments (K1-K3-K2). Therefore, a smooth and stable rolling operation is realized particularly in the high-speed movement. Thus, according to the present embodiment, it is possible to provide the motion guide device 10 satisfying the demand for high-speed (equal to or faster than 5 m/s, for example) operation of the movable block.

As described above, the presence of the rolling body scooping arm 41 in accordance with the present embodiment provides various favorable operation effects. Further, when the length of the rolling body scooping arm 41 is extended and the amount of the rolling body scooping arm 41 inserting into the movable block body 14 is extremely increased, the number of balls 12 rolling in the loaded ball rolling passage 15 is reduced, and thus the amount of the load allowance of the motion guide device 10 is reduced. Therefore, it is necessary for the rolling body scooping arm 41 to have an appropriate length. Here, the forming condition of the rolling body scooping arm 41 in accordance with the present embodiment will be described with reference to FIG. 8.

As schematically illustrated in FIG. 8, when the length of the gentle surface processing portion 61 is set to Δ and the distance from the scooping starting point S at which the balls 12 rolling in the loaded ball rolling passage 15 are scooped by the rolling body scooping arm 41 to the connection surface between the movable block body 14 and the end plate 14b is set to δ, it is necessary for the present embodiment to be configured to satisfy the inequality of $$\Delta \geq \delta$$

it is possible to realize the motion guide device 10 capable of favorably performing an scooping operation of the ball 12 by the configuration satisfying the condition described above while the number of balls 12 rolling in the loaded ball rolling passage 15 is prevented from being extremely reduced. In addition, the reduction in the size of the device can be achieved and the high-speed operation of the movable block can be realized by the configuration where the rolling body scooping arm 41 with an appropriate length is inserted into the movable block body 14. In other words, according to the present embodiment, it is possible to realize the motion guide device 10 where the reduction in the size of the device is achieved and the demand for high-speed (equal to or faster than 5 m/s, for example) operation of the movable block is satisfied.

Hereinbefore, the embodiment suitable for the present invention is described. However, the technical scope of the present invention is not limited to the range of the embodiment described above. In the embodiment, various modifications and improvements can be made.

For example, in the movable block 13 in accordance with the present embodiment described above, the movable block body 14, the pair of return pieces 14a, and the pair of end plates 14b are separate members and the movable block 13 is constituted by combining the separate members. However, these members can also be constituted as an integral structure by using an injection molding technique or the like. For example, the return piece and the end plate can also be constituted by one member.

Figure 9:
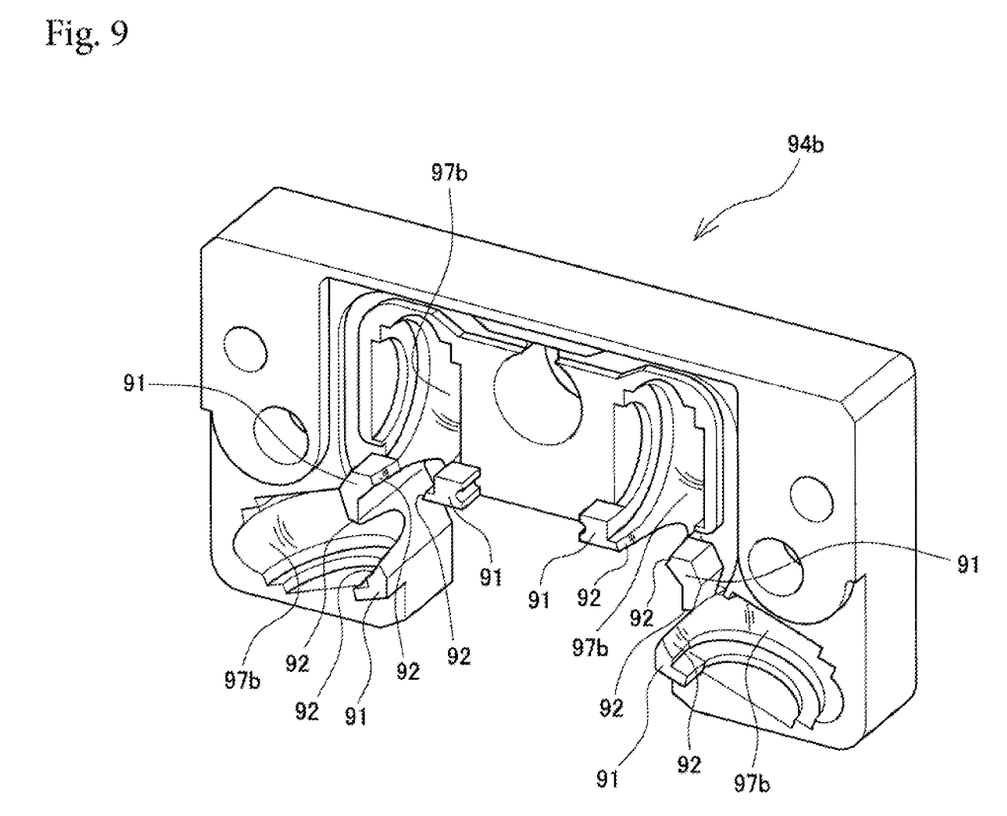
FIG. 9 is a view illustrating an example of various modified examples that an end plate can take in accordance with the present invention.

In addition, in the present embodiment described above, the configuration where the rolling body scooping arm 41 is arranged such that one rolling body scooping groove 42 is continuous with the one outer peripheral-side direction change groove 17b is illustrated. In other words, the rolling body scooping arm 41 in accordance with the present embodiment adopts a configuration, a so-called single arm scooping configuration, where the plurality of balls 12 are scooped up at one point. Further, the single arm scooping configuration adopted in the present embodiment is characterized in that the direction of the contact angle of the ball 12 and the direction of the turn may not be the same, and it is possible to obtain the effect that the degree of freedom of design is improved by the characteristic. However, the scope of the invention is not limited to such a single arm scooping configuration. For example, as illustrated in FIG. 9, an endplate 94b having a configuration where a plurality of rolling body scooping arms 91 are arranged such that two rolling body scooping grooves 92 are continuous with one outer peripheral-side direction change groove 97b can also be adopted. A modified example illustrated in FIG. 9 illustrates a configuration example of a so-called double arm scooping and can achieve similar operation effects to the embodiment described above. In addition, the plurality of balls 12 can be scooped up at two points, and thus it is advantageous in terms of rigidity.

The "motion guide device" in this description includes a device performing various rolling/sliding motion such as general rolling bearings used for a machine tool or the like, non-lubricating bearing used in vacuum, a linear guide, a linear guide device, a ball spline device, and a ball screw device.

It is obvious from the description of the claims that configurations with various modifications or improvements can also be included in the technical scope of the present invention.

Application Example of Actuator

Figure 10:
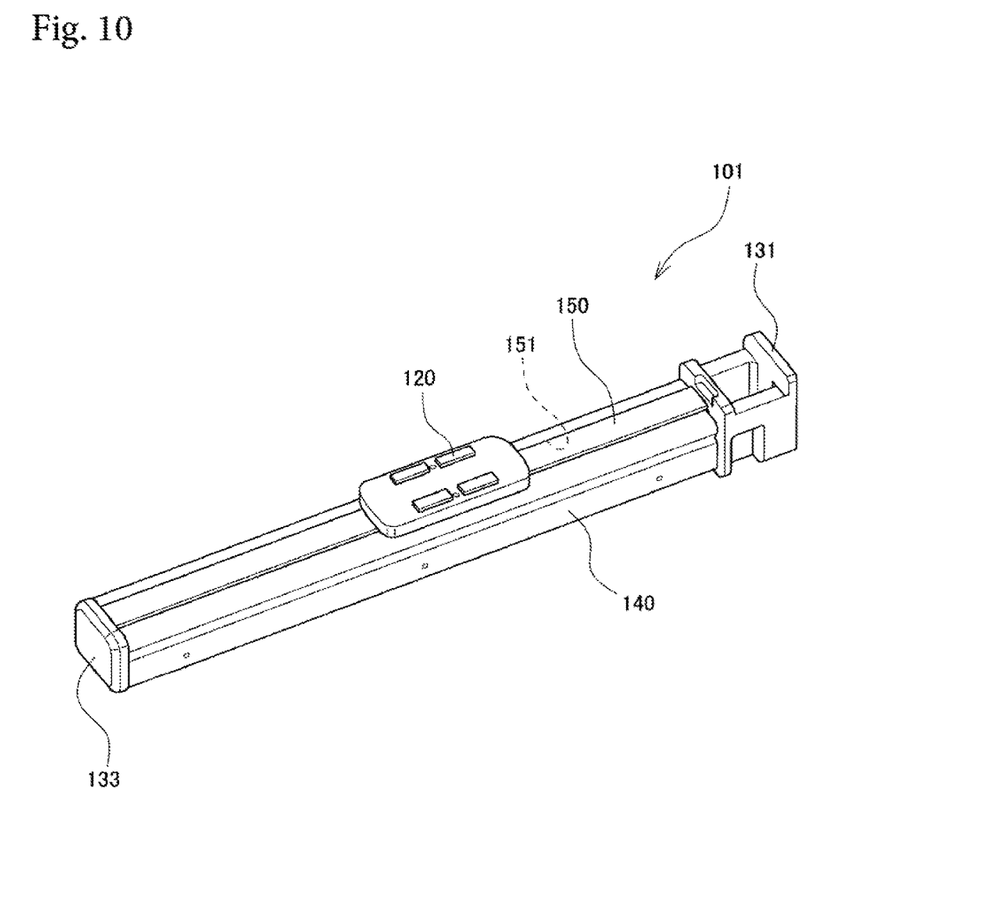
FIG. 10 is a perspective view illustrating the entirety of the configuration of an actuator in accordance with the present example.
Figure 11:
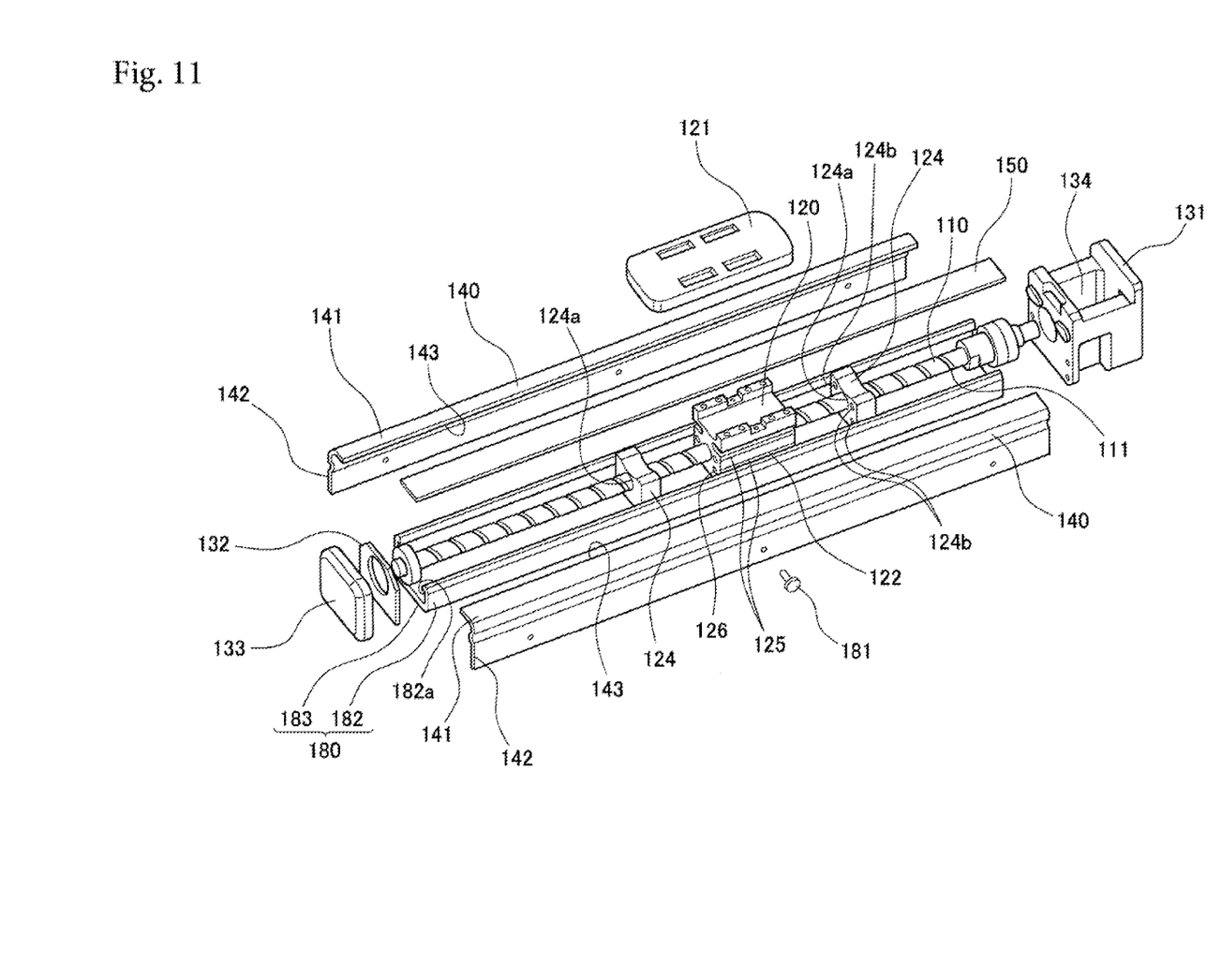
FIG. 11 is an exploded perspective view of the actuator in accordance with the present example.

Hereinbefore, the motion guide device in accordance with the present invention is described. In relation to the motion guide device in accordance with the present invention, an actuator can be configured by using the motion guide device. Here, an example where the motion guide device in accordance with the present invention is used in an actuator will be described below with reference to FIGS. 10 and 11. FIG. 10 is a perspective view illustrating the entirety of the configuration of an actuator in accordance with a present example. FIG. 11 is an exploded perspective view of the actuator in accordance with the present example.

As illustrated in FIG. 10, an actuator 101 in accordance with the present example is formed in an elongated box shape so as to have a pair of side covers 140 each of which extends in a longitudinal direction and bridges between a first end member 131 and a second end member 132, a pair of end members which is mounted on both ends of the side covers 140 and constituted of the first end member 131 and the second end member 132, and an upper cover 150 which closes an opening portion 151 formed along the longitudinal direction between facing surfaces of the side covers 140. Furthermore, the second end member 132 is covered by a side lid 133 and forms the outline shape of the actuator 101 in accordance with the present example. In addition, an inner block 120 as a movable block reciprocating along the opening portion 151 is attached via bypassing means (not illustrated) for bypassing the upper cover 150 at a position at which the upper cover 150 and the inner block 120 overlap each other.

As illustrated in FIG. 11, in the actuator 101 in accordance with the present example, a screw shaft 110 having a screw shaft rolling body rolling groove 111 of a spiral shape formed in the outer surface thereof and extending along the longitudinal direction is rotatably supported between the first end member 131 and the second end member 132 and one end of the screw shaft 110 is connected to a driving motor (not illustrated) disposed in a driving means accommodation portion 134 formed in the first end member 131.

In addition, the screw shaft 110 is inserted into a ball screw nut 122 formed in the lower end of the inner block 120 and the screw shaft 110 and the inner block 120 are engaged via a ball screw rolling body (not illustrated) interposed therebetween. Furthermore, in the inner block 120, two, four in total, second loaded rolling body rolling grooves 125 formed to be parallel to the screw shaft 110 are formed in each of both side surfaces. Further, a non-loaded rolling body rolling passage 126 drilled parallel to the screw shaft 110 is formed to correspond to the second loaded rolling body rolling groove 125. In addition, a pair of end plates 124 is attached to both end surfaces of the inner block 120.

The reciprocating motion of the inner block 120 is guided by an outer rail 180 as a track rail disposed in the lower end thereof. The outer rail 180 has a bottom portion 183 extending along the longitudinal direction and a pair of side wall portions 182 which is erected from both edges of the bottom portion 183 and faces both side surfaces of the ball screw nut 122. Further, a moving plate 121 is attached to the inner block 120 so as to interpose the upper cover 150 from above and below. In addition, a rolling body rolling groove 182a is formed in the side wall portion 182 so as to face the second loaded rolling body rolling groove 125 and a loaded rolling body rolling passage is constituted of the second loaded rolling body rolling groove 125 and the rolling body rolling groove 182a. Furthermore, a through hole 124a in which the screw shaft 110 is inserted and a direction change passage 124b connecting the loaded rolling body rolling grooves 125 and 182a and the non-loaded rolling body rolling passage 126 are formed in the end plate 124.

The inner block 120 is mounted on the outer rail 180 via a plurality of rolling bodies (not illustrated). The rolling bodies roll in the infinite circulation passage constituted of the loaded rolling body rolling grooves 125 and 182a, the direction change passage 124b, and the non-loaded rolling body rolling passage 126, in such a manner that the infinite circulation of the rolling bodies is performed and the inner block 120 is reciprocatively movably guided along the outer rail 180.

The side cover 140 has an upper plate 141 extending parallel to the upper cover 150 and a side plate 142 extending downward from the upper plate 141. A sealing portion 143 in contact with the upper cover 150 is formed in the end portion of the upper plate 141. Further, the sealing portion 143 may be in contact with the upper cover in any way as long as the upper cover 150 can be sealed. However, for example, it is preferable that the sealing portion 143 be magnetically attached to the upper cover 150 by attaching a permanent magnet or the like to the sealing portion 143. Further, it is preferable that a magnetic stainless tape or the like be adopted to the upper cover 150. Further, the side cover 140 is mounted and fixed by fastening the side plate 142 to the outer rail 180 with a fastening bolt 181.

As described above, the actuator 101 using the motion guide device according to the present invention can be realized. The actuator 101 is a so-called full-cover type actuator 101 including a dustproof mechanism. Since dustproofness can be imparted to the motion guide device even in an adverse environment, it is possible to provide a stable guide operation for a long period.

REFERENCE NUMERALS

10: motion guide device, 11: track rail, 11a: ball rolling groove, 12: ball, 13: movable block, 13a: loaded ball rolling groove, 13b: opening portion, 13c: female thread, 14: movable block body, 14a: return piece, 14b, 94b: end plate, 15:

loaded ball rolling passage, 16: non-loaded ball rolling passage, 17: direction change passage, 17a: inner peripheral-side direction change groove, 17b, 97b: outer peripheral-side direction change groove, 20: infinite circulation passage, 41, 91: rolling body scooping arm, 42, 92: rolling body scooping groove, 61: gentle surface processing portion, S: scooping starting point, L1: tangential direction of ball at scooping starting point, L2: travelling direction of ball at scooping starting point, θ, θ1, θ2: scooping angle of ball, P: load in ball rolling direction, F: collision load on end plate, 81, 82: gap between ball and rolling passage by providing gentle surface processing portion, Ka, K1: first imaginary line, Kb, K2: second imaginary line, K3: third imaginary line, Δ: length of gentle surface processing portion, δ: distance from scooping starting point to connection surface between movable block body and end plate, 101: actuator, 110: screw shaft, 111: screw shaft rolling body rolling groove, 120: inner block, 121: moving plate, 122: ball screw nut, 124: end plate, 124a: through hole, 124b: direction change passage, 125: second loaded rolling body rolling groove, 126: non-loaded rolling body rolling passage, 131: first end member, 132: second end member, 133: side lid, 134: driving means accommodation portion, 140: side cover, 141: upper plate, 142: side plate, 143: sealing portion, 150: upper cover, 151: opening portion, 180: outer rail, 181: fastening bolt, 182: side wall portion, 182a: rolling body rolling groove, 183: bottom portion.

The invention claimed is:

1. A motion guide device comprising:
a track rail in which a rolling body rolling groove is formed along a longitudinal direction; and
a movable block which is relatively movably mounted on the track rail via a plurality of rolling bodies,
wherein the movable block includes:
a movable block body which has a loaded rolling body rolling groove forming a loaded rolling body rolling passage in cooperation with the rolling body rolling groove and has a non-loaded rolling body rolling passage arranged parallel to the loaded rolling body rolling groove, the movable block body further having end surfaces;
return members which are attached to both of the end surfaces of the movable block body in a relative movement direction and in which inner peripheral-side direction change grooves connecting a part of the loaded rolling body rolling passage and a part of the non-loaded rolling body rolling passage are formed; and
a pair of end plates, each of the end plates being mounted on a respective one of the end surfaces of the movable block body in the relative movement direction to cover the return members and in which outer peripheral-side direction change grooves are formed in surface sides where the end plates are mounted on the movable block body, and
wherein each of the end plates has a rolling body scooping arm protruding towards the movable block body, the rolling body scooping arm forming a rolling body scooping groove continuous with the outer peripheral-side direction change groove,
wherein the loaded rolling body rolling groove has a surface processing portion inclining towards the inner peripheral-side direction change groove and connecting to the inner peripheral side direction change groove in the return member,
wherein the rolling body scooping groove and the surface processing portion are arranged to face in the loaded rolling body rolling passage, and
wherein, when the length of the surface processing portion is set to Δ and the distance from a scooping starting point at which the rolling bodies rolling in the loaded rolling body rolling passage are scooped by the rolling body scooping arm to the connection surface between the movable block body and the end plate is set to δ, the inequality of Δ≥δ is satisfied.

2. The motion guide device according claim 1,
wherein, in a case where the rolling trajectory of a center point of the rolling body when the rolling body rolls from the loaded rolling body rolling passage to a direction change passage formed by the inner peripheral-side direction change groove and the outer peripheral-side direction change groove is grasped as an imaginary line, the imaginary line is constituted of a first imaginary line which can be grasped as a straight line in the loaded rolling body rolling passage, a second imaginary line which can be grasped as a curved line with constant curvature in the direction change passage, and a third imaginary line which passes through the contact surface between the movable block body and the end plate, is continuous as a straight line connecting the first imaginary line and the second imaginary line, and is directed to a direction different from that of the first imaginary line.

3. An actuator which is constituted using the motion guide device according to claim 1.

* * * * *